Jan. 3, 1950  T. L. MAY  2,493,495
CLUTCH AND BRAKE MECHANISM FOR PRESSES
Filed Dec. 30, 1944  5 Sheets-Sheet 4

INVENTOR.
Thomas Lestler May
BY
Kenyon & Kenyon
ATTORNEYS

Jan. 3, 1950 T. L. MAY 2,493,495
CLUTCH AND BRAKE MECHANISM FOR PRESSES
Filed Dec. 30, 1944 5 Sheets-Sheet 5
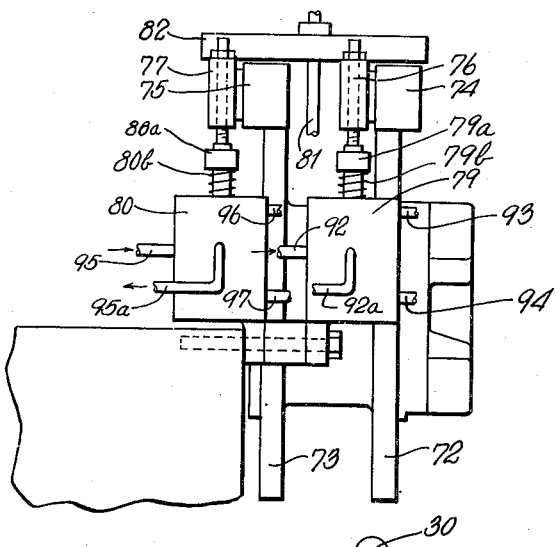
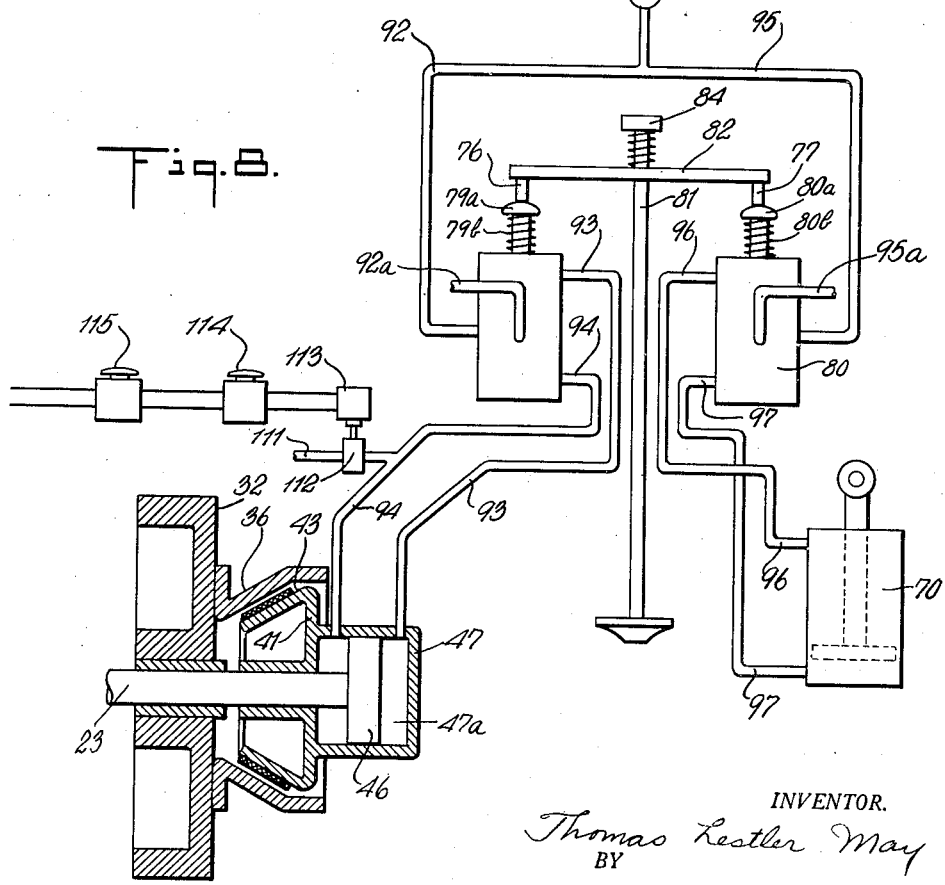
INVENTOR.
Thomas Lestler May
BY
Kenyon & Kenyon
ATTORNEYS Patented Jan. 3, 1950

2,493,495

UNITED STATES PATENT OFFICE 2,493,495

CLUTCH AND BRAKE MECHANISM FOR PRESSES

Thomas Lestler May, New York, N. Y., assignor, by mesne assignments, to Reliance Hydraulic Press, Inc., New York, N. Y., a corporation of New York Application December 30, 1944, Serial No. 570,621

2 Claims. (Cl. 192—17)

1

This invention relates to flywheel type punch presses.

An object of this invention is a flywheel punch press which is reliable in operation, can be operated at high speed, is silent in operation, has a long, efficient life and is of simple construction.

In a flywheel punch press embodying this invention, hydraulic means are provided for clutching and declutching the flywheel and crank shaft and additional hydraulic means are provided for applying and releasing brake means for the crank shaft. Cams rotatable with the crank shaft actuate four-way fluid valves to control the flow of hydraulic fluid to and from both hydraulic means. By reason of this structure, the noisy clicking incidental to mechanical clutch and brake-operating means is avoided, thereby rendering silent the operation of the press. Means also are provided for preventing operation of the hydraulic means to clutch the flywheel and crank shaft except when the operator's both hands are in a position of safety. Also, the press frame is mounted on a base for limited tilting movement whereby the angularity of the frame may be varied.

Other objects, novel features and advantages of this invention will become apparent from the following specification and accompanying drawings, wherein:

Fig. 7 is a side elevation of Fig. 6, and

Fig. 8 is a hydraulic diagram.

Figure 1:
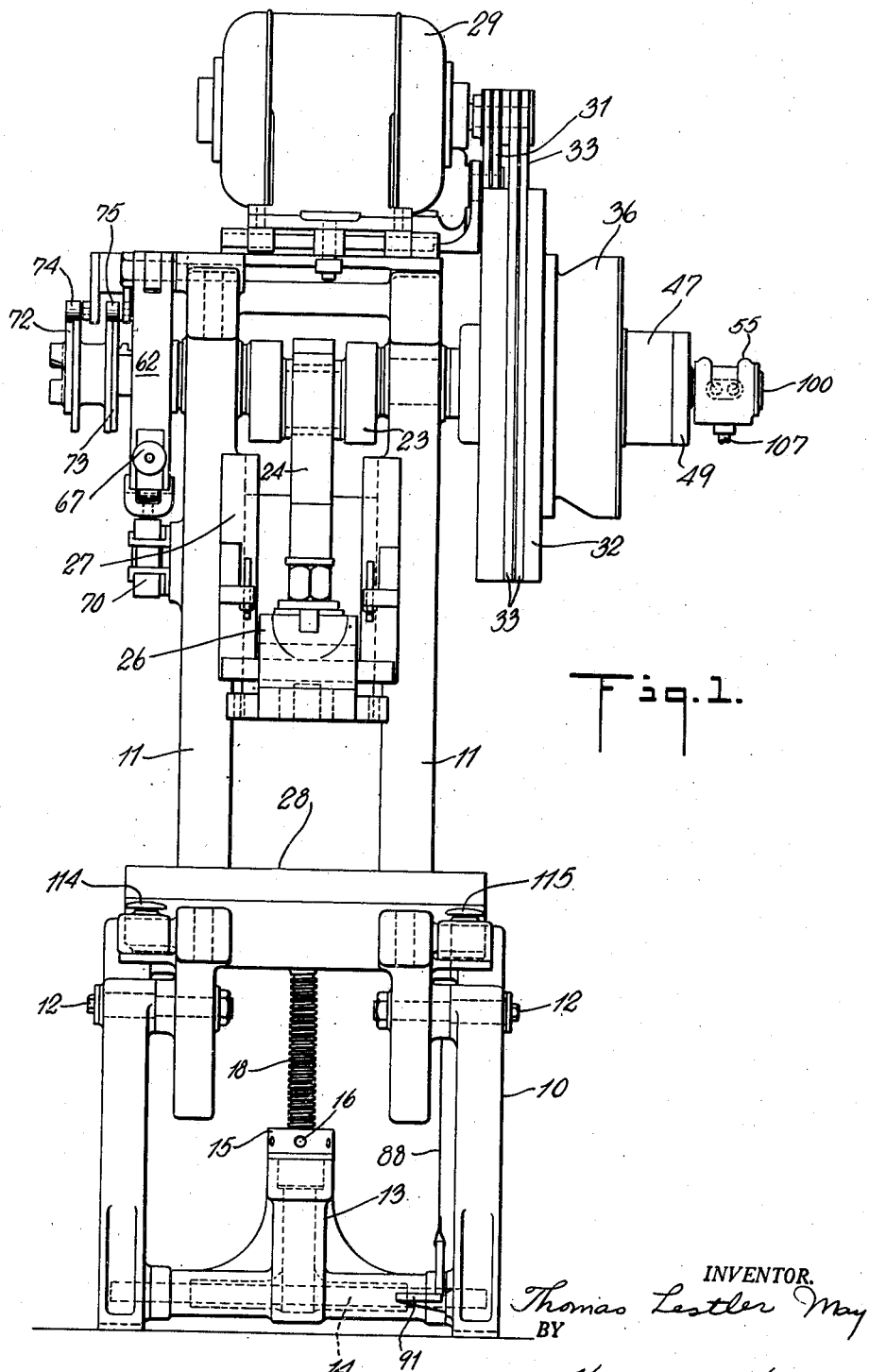
Fig. 1 is a front elevation of a press constructed in accordance with the invention.
Figure 2:
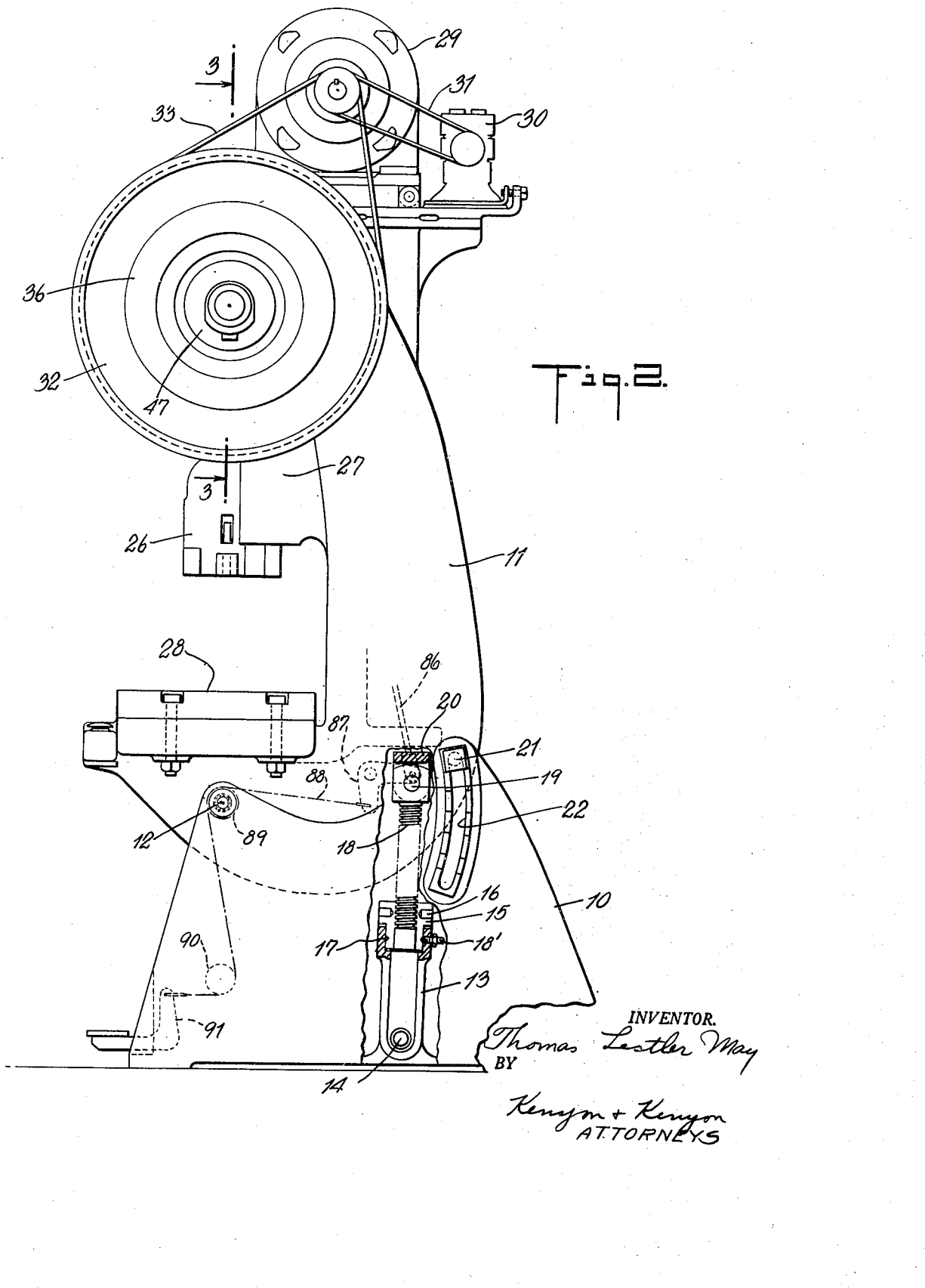
Fig. 2 is a side elevation.
Figure 3:
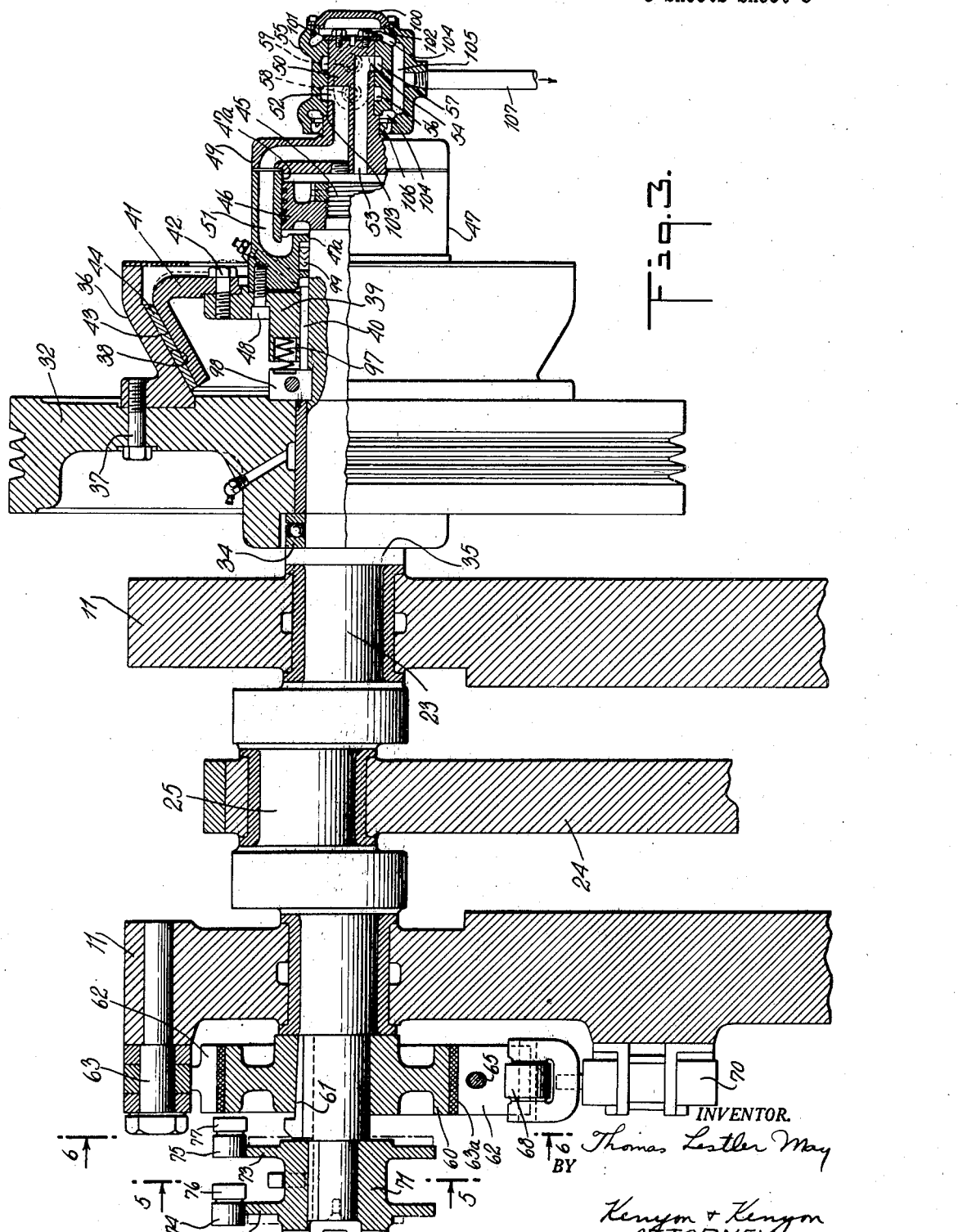
Fig. 3 is a section on the line 3—3 of Fig. 2.

A base 10 has a frame 11 pivotally connected thereto by means of shafts 12. A hollow member 13 is pivotally supported at one end by the pin 14 mounted in the base 10 and in its free end the member 13 receives a rotatable member 15 having a plurality of radial recesses 16. The members 13 and 15 are provided with co-operating shoulders to limit movement of the member 15 toward the pivot pin 14 and the member 15 is provided with a peripheral groove 17 into which projects the inner end of a screw 18' mounted in the member 13 to prevent withdrawal of the member 15 from the member 13. The member 15 has a threaded bore in which is arranged a lag screw 18, the upper end of which

2 has a transverse bore through which passes a pin 19, the ends of which are arranged in ears 20 formed on the frame 11. The shaft 12 is located near the front of the base and the lag screw 18, in combination with its associated parts, provides means for tilting the frame 11 at any desired angle upon rotation of the member 15 through the medium of a bar inserted in the recesses 16. The frame 11 carries a pin 21 projecting through an arcuate slot 22 in the base 10 concentric with the pivot pin 12 and serves to limit the extent of tilting of the frame 11 as well as to indicate the extent of tilting by reason of indicia provided in suitable relationship to the slot 22 for that purpose.

A crank shaft 23 is journalled in the frame 11 and a pitman rod 24 is attached in the usual manner to the crank pin 25 of the crank shaft 23. The lower end of the pitman rod is attached in the usual manner to a head 26 slidably supported by vertical guides 27 for movement toward and away from the bed 28 in the usual manner. The frame 11 supports a motor 29 and an oil pump 30 which is driven by the motor through the medium of a belt 31.

A flywheel 32 is journalled on one end of the crank shaft 23 and is driven by the motor 29 through the medium of a belt 33. A thrust bearing 34 is interposed between one face of the flywheel 32 and a shoulder 35 on the crank shaft 23. A circular clutch element 36 is held against the outer face of the flywheel 32 by bolts 37 and is provided with an inner tapering surface 38. A hub 39 is supported by the crank shaft 23 and is keyed thereto by a spline 40 so that the hub and shaft rotate in unison and the hub is movable axially of the shaft. A circular clutch element 41 is attached to the hub 39 by bolts 42 and has an outer conical face 43 complementary to the face 38 of the clutch element 36. A strip 44 of standard clutch facing material is fixed to the clutch element 41 and is arranged between the surfaces 43 and 38.

The extreme end of the crank shaft 23 has a threaded portion 45 of reduced diameter and a circular piston 46 has an interiorly threaded bore co-operating with the threaded portion 45 to attach the piston to the end of the shaft. A block 47 has a cylindrical bore 47a of two different diameters with the smaller diameter portion receiving the crank shaft and the larger diameter portion receiving the piston 46. The block 47 is attached to the collar 39 by bolts 48. A head 49 fits the outer end of the block 47 and has an extension 50. A passageway 51 leads from the inner end of the cylinder to a radial port 52 in the extension 50 while a passageway 53 leads from the outer end of the cylinder through the extension to a radial port 54. The cylinder 47a and the piston 45 constitute a hydraulic motor for actuating the clutch element 41 by reciprocation of the block 47 on the crank shaft 23. A cap 55 is journalled on the extension 50 and has circular recesses 56 and 57 communicating respectively with the ports 52 and 54. Ports 58 and 59 in the cap communicate with the recesses 56 and 57 respectively.

A brake drum 60 is fixed to the remaining end of the crank shaft 23 by a key 61. A split brake band 62 is supported by the frame 11 through the medium of a post 63 and is provided with a suitable brake lining 63a. The two sections of the brake band are urged toward the drum 62 by a spring 64 arranged on a rod 65 extending through the free ends of both of the band sections and having nuts 66 and 67 at the opposite ends thereof with the spring 64 arranged between one band section and the nut 67 which is adjustable to vary the tension exerted by the spring 64. A roller 68 is carried by a yoke at the end of the piston 69 of a hydraulic motor 70. The roller 68 is adapted to be projected by the hydraulic motor between the ends of the brake sections for the purpose of stretching apart the band sections to release the crank shaft. Upon withdrawal of the roller 68, the spring 64 urges the band sections into engagement with the brake drum 60 to oppose rotation of the shaft 23.

A sleeve 71 is keyed to the crank shaft 23 and is provided with a pair of cams 72 and 73 which have high sections 72a and 73a respectively and low sections 72b and 73b respectively. Cam followers 74 and 75 for co-operation with the peripheries of the cams 72 and 73 respectively are arranged at the ends of levers 76 and 77 respectively, fulcrumed at a common pivot pin 78. A pair of standard four-way fluid valves 79 and 80 are suitably arranged below the free ends of the levers 76 and 77 respectively for actuation thereby. The valves 79 and 80 have actuating plungers 79a and 80a respectively, as well as springs 79b and 80b respectively for normally maintaining the plunger in a predetermined adjustment. The plungers 79a and 80a are located respectively in the paths of the ends of the levers 76 and 77 opposite the cam followers 74 and 75. A rod 81 slidably carries a cross-bar 82 engaging the upper surfaces of the levers 76 and 77 on the opposite side of the pivot pin 78 from the cam followers. A spring 83 is interposed between the cross bar and a nut 84 on the end of the rod. The rod 81 is mounted in guides 85 and at its lower end is connected to the upper end of link 86, the lower end of which is connected to one arm of a bell crank lever 87, the other end of which is connected by a cable 88 passing over suitable guide rollers 89 and 90 to a foot pedal 91. The arrangement is such that upon depression of the pedal 91, the rod 81 is caused to move downwardly.

An oil supply pipe 92 leads from a pump 30 to the inlet port of the four-way valve 79 and a pipe 92a leads from the return port of said valve to a reservoir (not shown). A pipe 93 leads from the third port of the valve 91 to the port 58 of the cap 55 while a pipe 94 leads from the fourth port of the valve 79 to the port 59 of the cap 55. Similar connections 95, 95a, 96 and 97 are provided between the pump 30 and the four-way valve 80 and between said valve and the hydraulic motor 70.

Figures 4, 5:
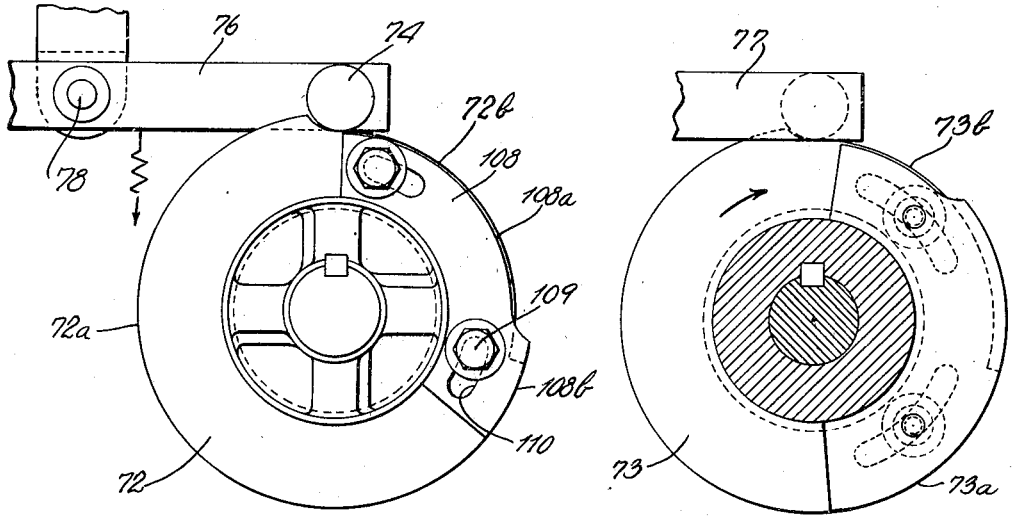
Fig. 4 is a fragmentary end view of Fig. 3.
Fig. 5 is a section on the line 5—5 of Fig. 3.
Figure 6:
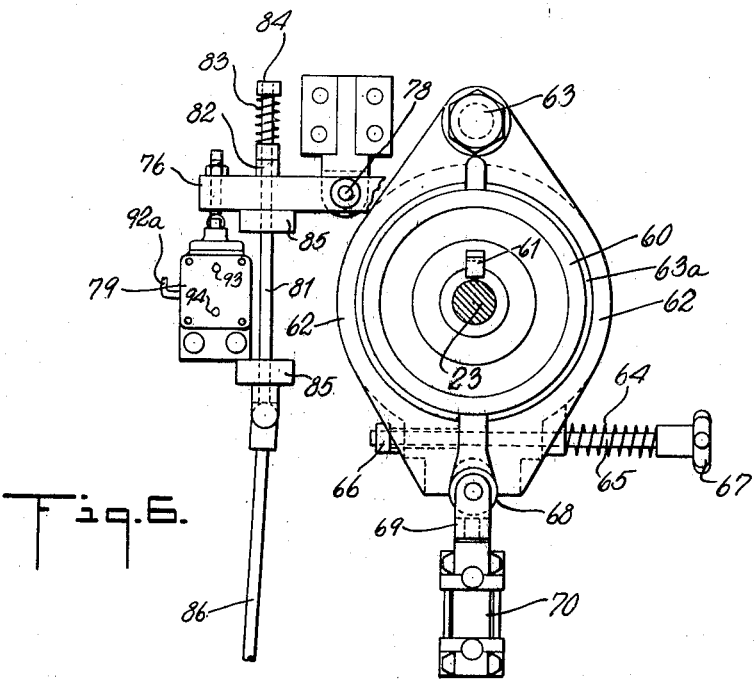
Fig. 6 is a section substantially on the line 6—6 of Fig. 3.

The arrangement is such that with the clutch inoperative and the brake operative, the cam followers 74 and 75 contact the low sections 72b and 73b of the cams 72 and 73, as indicated in Figs. 4 and 5 near the trailing ends thereof. With the parts in the position shown in Figs. 4 and 5, the valve plungers 79a and 80a are in such position that hydraulic fluid is supplied under pressure to the upper end of the hydraulic motor 70 to locate the roller 68 out of engagement with the brake sections to permit the spring 64 to hold the brake sections against the drum 60 to oppose rotation of the crank shaft and hydraulic fluid is supplied under pressure to the outer end of the cylinder 47a to hold it and the drum 41 with the clutch facing 46 out of engagement with the member 36 so that the flywheel 32 rotates freely on the shaft 23. The pedal 91 is in its uppermost position to which position it is biased by the springs 79b and 80b. Upon depression of the pedal 91, the levers 76 and 77 are tilted to lift the cam followers 74 and 75 and to depress both valve plungers 79a and 80a whereupon the supply of hydraulic fluid to the motor 70 is reversed to force the roller 68 between the ends of the brake sections to release the crank shaft 23 for rotation. Also, the supply of hydraulic fluid to the cylinder 47 is reversed to apply pressure urging the cylinder 47 in the direction to engage the clutch facing 44 with the surface 38 to clutch the flywheel to the crank shaft to cause rotation of the latter. The cams 72 and 73 rotate clockwise from the position shown in Fig. 4 to locate the high sections 72a and 73a under the cam followers to hold the levers 76 and 77 tilted after the release of the pedal 91. After predetermined extent of rotation of the crank shaft, the cam followers ride off the high sections 72a and 73a into contact with the low sections 72b and 73b thereby permitting return of the four-way valves 79 and 80 to their original positions under the influence of their springs and corresponding return of the levers 76 and 77 to original position. The extent of the high section 73a is greater than the extent of the high section 72a so that the clutch is released before the brake is actuated. The hydraulic motor 70 is thereupon actuated to withdraw the roller 68 from between the ends of the brake band sections and also the clutch hydraulic motor is actuated to disengage the clutch facing 44 from the surface 38 thereby stopping the crank shaft after one complete revolution.

Declutching of the flywheel from the crank shaft is facilitated by springs 97 seated in sockets in the hub 39 and bearing against a collar 98 attached to the crank shaft 23 and engaging the flywheel 32. A suitable packing 99 provides a fluid-tight seal between the crank shaft 23 and the block 47. The end of the cap 55 is formed as a detachable cover 100 and a plate 101 attached to the end of the shaft 23 by bolts 102 holds the cap in position on the shaft against a shoulder 103. At each end of the cap 55 there is provided a circular chamber 104 connecting with a longitudinal chamber 105 arranged below the extension 50. The cover 100 closes one chamber 104 while a sealing member 106 closes the other. Any hydraulic fluid which escapes along the surface of the extension 50 from the grooves 52 and 54 is conducted by the chambers 104 to the chamber 105 from which it is returned through the pipe 107 to the reservoir of the hydraulic system.

Each of the cams 72 and 73 is so constructed as to permit change of the effective length of the high sections 72a and 73a respectively and low sections 72b and 73b respectively. This construction will be described only in connection with cam 72 but it is to be understood that the cam 73 is of the same construction. The cam 72 is provided with a low section 72b of definite length and the cam supports an arcuate member 108 by studs 109 passing through arcuate slots 110 in the cam 72 coaxial therewith. The member 108 is provided with high and low sections 108b and 108a corresponding to the high and low sections 72a and 72b. By rotatable adjustment of the member 108 the effective lengths of the high and low sections of the cam may be varied within limits thereby varying the timing of the valve 79.

The press is equipped with mechanism to prevent operation of it except when the operator's hands are both in positions of safety. A bleed 111 leads from the pipe 94 through which the hydraulic fluid is supplied to the clutch-operating hydraulic motor for the purpose of clutching the shaft 23 to the flywheel 32. The bleed 111 is controlled by a valve 112 operated by a solenoid 113, the arrangement being such that with the solenoid deenergized, the valve is opened allowing hydraulic fluid to pass through the bleed from the pipe 94 to a reservoir (not shown). The energizing circuit for the solenoid includes a pair of palm switches 114 and 115 arranged in front of the press bed 28 (Fig. 1). These switches are self-opening and are closed by downward pressure of the operator's hands and both switches must be closed in order to energize the solenoid 113. Should the pedal 91 be tripped with either switch 114 and 115 open, the pressure of the hydraulic fluid supplied to the clutch-operating motor will be insufficient to energize it because of the fact that the bleed 111 is open and hydraulic fluid is by-passed therethrough to the reservoir. In order to clutch the flywheel 32 to the shaft 23, both switches 114 and 115 must be closed and the pedal 91 depressed.

It is of course understood that various modifications may be made in the device above described without in any way departing from the spirit of the invention as defined in the appended claims.

I claim:

1. A punch press comprising a rotatable crank shaft, a flywheel journalled on said shaft, means for clutching and declutching said flywheel and crank shaft, a hydraulic motor for actuating said means, a brake mechanism for said crank shaft, means including a hydraulic motor for actuating said brake mechanism, and means including cam members rotatable with said crank shaft for regulating flow of hydraulic fluid to and from said hydraulic motors, each cam member having a high section and a low section, a pivoted lever associated with each cam member and provided with a cam follower, means biasing said levers and cam followers toward said cam members, and means including a pedal for rotating said levers contrary to said biasing means.

2. A punch press according to claim 1 characterized by said cam members being so related to each other that both motors are simultaneously operated and are successively operated first to declutch said flywheel and then to apply said brake mechanism.

THOMAS LESTLER MAY.

REFERENCES CITED

The following references are of record in the file of this patent:

UNITED STATES PATENTS

| Number | Name | Date |
|---|---|---|
| 312,146 | Merritt | Feb. 10, 1885 |
| 615,441 | Emmerich et al. | Dec. 6, 1898 |
| 769,955 | Osswald | Sept. 13, 1904 |
| 975,589 | Watkins | Nov. 15, 1910 |
| 1,544,766 | Leschhorn | July 7, 1925 |
| 1,547,355 | Bayer et al. | July 28, 1925 |
| 1,869,085 | Williamson | July 26, 1932 |
| 1,894,434 | Williamson | Jan. 17, 1933 |
| 2,068,062 | Metten | Jan. 19, 1937 |
| 2,085,040 | Post | June 29, 1937 |
| 2,120,798 | Criley | June 14, 1938 |
| 2,204,710 | Strout | June 18, 1940 |